United States Patent
Onuki

(10) Patent No.: US 11,108,944 B2
(45) Date of Patent: Aug. 31, 2021

(54) IMAGE PROCESSING APPARATUS FOR PROVIDING INFORMATION FOR CONFIRMING DEPTH RANGE OF IMAGE, CONTROL METHOD OF THE SAME, AND STORAGE MEDIUM

(71) Applicant: CANON KABUSHIKI KAISHA, Tokyo (JP)

(72) Inventor: Kenji Onuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 16/683,408

(22) Filed: Nov. 14, 2019

(65) Prior Publication Data

US 2020/0162660 A1    May 21, 2020

(30) Foreign Application Priority Data

Nov. 16, 2018 (JP) .............................. JP2018-215783

(51) Int. Cl.
*H04N 5/232* (2006.01)
*G06T 1/20* (2006.01)
(Continued)

(52) U.S. Cl.
CPC .......... *H04N 5/23212* (2013.01); *G06T 1/20* (2013.01); *G06T 1/60* (2013.01); *H04N 5/235* (2013.01);
(Continued)

(58) Field of Classification Search
None
See application file for complete search history.

(56) References Cited

U.S. PATENT DOCUMENTS

| 9,591,246 | B2 * | 3/2017 | Oikawa | ..................... G06T 1/00 |
| 2014/0176776 | A1 * | 6/2014 | Morita | ................. H04N 5/2621 |
| | | | | 348/333.11 |

(Continued)

FOREIGN PATENT DOCUMENTS

| JP | 2003-090952 A | 3/2003 |
| JP | 2006-054536 A | 2/2006 |

(Continued)

OTHER PUBLICATIONS

Shingo Mori, U.S. Appl. No. 16/680,810, filed Nov. 12, 2019 Image Processing Apparatus for Providing Information for Focus Adjustment, Control Method of the Same, and Storage Medium (Application not enclosed).

*Primary Examiner* — James M Hannett
(74) *Attorney, Agent, or Firm* — Cowan, Liebowitz & Latman, P.C.

(57) ABSTRACT

An image processing apparatus comprises at least one processor which function as: an obtaining unit configured to obtain one or more images; and a display control unit configured to display the one or more images on a display in a different display mode and to superimpose, on an image, information indicating a defocus range of the image on a basis of the display mode and defocus information. The display control unit changes, depending on whether a first number of images are displayed or a second number of images are displayed, displaying that uses information indicating a defocus range of focus or non-focus and information indicating a defocus range in which a focus position is changeable or a defocus range of a case where an aperture value is changed.

18 Claims, 11 Drawing Sheets

(51) Int. Cl.
   *G06T 1/60* (2006.01)
   *H04N 5/235* (2006.01)
   *G06T 5/50* (2006.01)
   *G06T 1/00* (2006.01)

(52) U.S. Cl.
   CPC ....... *H04N 5/23229* (2013.01); *G06T 1/0007* (2013.01); *G06T 5/50* (2013.01)

(56) References Cited

U.S. PATENT DOCUMENTS

| | | | |
|---|---|---|---|
| 2014/0253760 A1* | 9/2014 | Watanabe | H04N 5/23216 348/239 |
| 2014/0267869 A1* | 9/2014 | Sawa | H04N 5/232939 348/333.03 |
| 2015/0054982 A1* | 2/2015 | Ota | G06T 7/74 348/231.6 |
| 2016/0127636 A1 | 5/2016 | Ito et al. | |
| 2017/0064192 A1 | 3/2017 | Mori | |
| 2017/0201674 A1* | 7/2017 | Yamamoto | H04N 5/23293 |
| 2017/0372673 A1* | 12/2017 | Yeung | G09G 5/005 |
| 2018/0007290 A1* | 1/2018 | Matsunaga | G06T 3/40 |
| 2019/0304122 A1* | 10/2019 | Matsunaga | G06T 7/70 |

FOREIGN PATENT DOCUMENTS

| | | |
|---|---|---|
| JP | 2014-197824 A | 10/2014 |
| JP | 2016-009062 A | 1/2016 |

\* cited by examiner

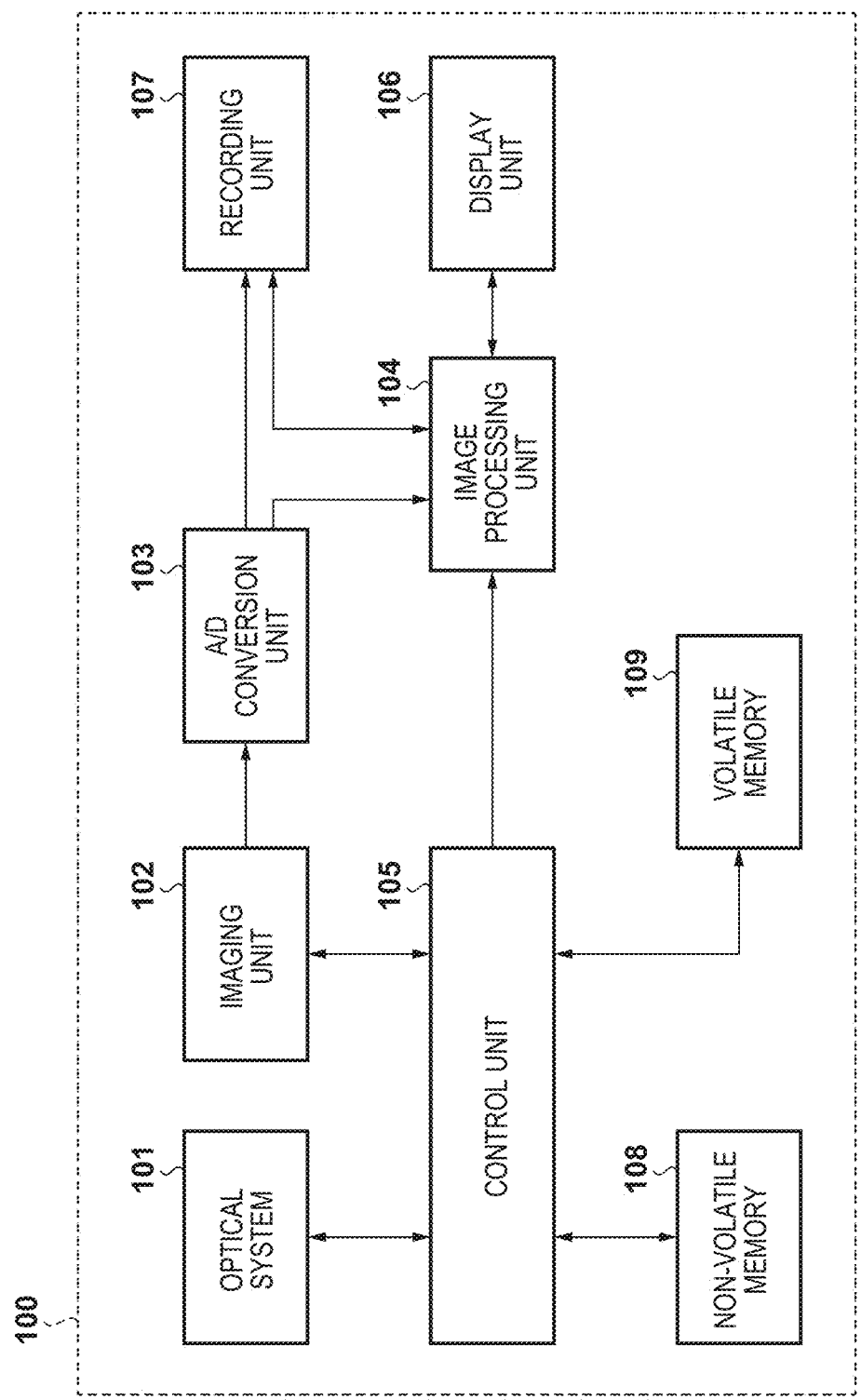

FIG. 2A
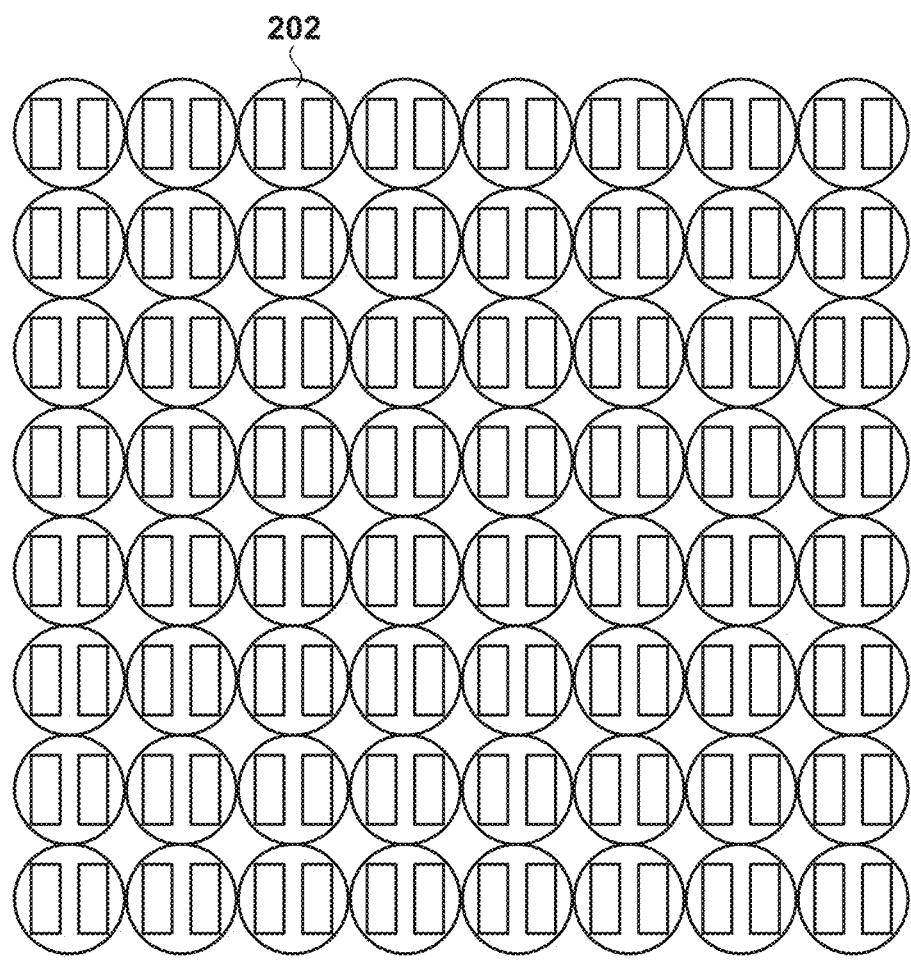
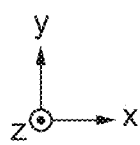
FIG. 2B
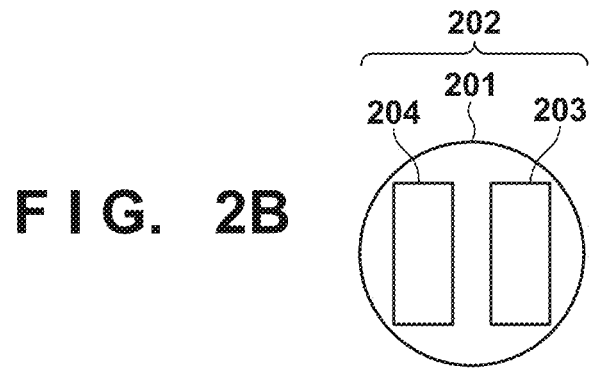

IMAGE PROCESSING APPARATUS FOR PROVIDING INFORMATION FOR CONFIRMING DEPTH RANGE OF IMAGE, CONTROL METHOD OF THE SAME, AND STORAGE MEDIUM

BACKGROUND OF THE INVENTION

Field of the Invention

The present invention relates to an image processing device that provides information for confirming a depth range of an image, a control method of the same, and a storage medium.

Description of the Related Art

In the related art, in a photographing device such as a digital camera, a technique is known in which the focus state of a subject and the like are displayed in an electronic viewfinder (EVF) using a display element such as an LCD such that the user can capture an image while confirming the depth of field and the focus state of the subject, and the like.

Japanese Patent Laid-Open No. 2014-197824 discloses a technique of presenting to the user an index representing the depth of field and the subject range that can be refocused during image-capturing and the like. Japanese Patent Laid-Open No. 2003-90952 discloses a technique of changing the display state of a focal point detection region that is displayed during image playback in accordance with a focal point detection region selection mode and a focal point adjustment mode corresponding to the playback image.

Here, when a user views a captured image, the display state of the image may be changed depending on the purpose. For example, in the case where the depth range is confirmed in a single image, the image may be displayed at unity magnification or under magnification, while in the case where successful or failed photographs are selected or deleted, a plurality of images may be displayed in a multi-display so as to view the images at the same time.

In the technique disclosed in Japanese Patent Laid-Open No. 2014-197824, for example, when a plurality of images are displayed in a multi-display and viewed at the same time, the display of each image is downsized and consequently the visibility is reduced. As such, in some situations, complex information may become disadvantageous in terms of the user's purposes. In addition, with the technique disclosed in Japanese Patent Laid-Open No. 2003-90952, displaying the information reflecting the mode of focal point detection at the time of image-capturing alone may not provide sufficient information for confirmation of the depth range and determination of success of the image-capturing.

SUMMARY OF THE INVENTION

The present disclosure has been made in consideration of the aforementioned issues, and realizes a technique capable of easily performing desired confirmation even in the case where a plurality of display states are used in playback of captured images for confirming the depth range.

In order to solve the aforementioned problems, one aspect of the present disclosure provides an image processing apparatus comprising a memory and at least one processor which function as: an obtaining unit configured to obtain one or more images; and a display control unit configured to display the one or more images on a display in a different display mode and to superimpose, on an image displayed on the display, information indicating a defocus range of the image on a basis of the display mode and defocus information indicating a shift amount and a shift direction of a focal point in the image displayed on the display, wherein, depending on whether a first number of images are displayed on the display or a second number of images are displayed on the display, the display control unit changes displaying that uses information indicating a defocus range of focus or non-focus and information indicating a defocus range in which a focus position is changeable or a defocus range of a case where an aperture value is changed from an aperture value of a time of image-capturing.

Another aspect of the present disclosure provides, a control method of an image processing apparatus, the method comprising obtaining one or more images; and display controlling by displaying the one or more images on a display in a different display mode and superimposing, on an image displayed on the display, information indicating a defocus range of the image on a basis of the display mode and defocus information indicating a shift amount and a shift direction of a focal point in the image displayed on the display, wherein, depending on whether a first number of images are displayed on the display or a second number of images are displayed on the display, the display controlling includes changing displaying that uses information indicating a defocus range of focus or non-focus and information indicating a defocus range in which a focus position is changeable or a defocus range of a case where an aperture value is changed from an aperture value of a time of image-capturing.

Still another aspect of the present disclosure provides, a non-transitory computer-readable storage medium storing a program for causing a computer to execute a control method of an image processing apparatus, the method comprising obtaining one or more images; and display controlling by displaying the one or more images on a display in a different display mode and superimposing, on an image displayed on the display, information indicating a defocus range of the image on a basis of the display mode and defocus information indicating a shift amount and a shift direction of a focal point in the image displayed on the display, wherein, depending on whether a first number of images are displayed on the display or a second number of images are displayed on the display, the display controlling includes changing displaying that uses information indicating a defocus range of focus or non-focus and information indicating a defocus range in which a focus position is changeable or a defocus range of a case where an aperture value is changed from an aperture value of a time of image-capturing.

According to the present invention, it is possible to easily perform desired confirmation even in the case where a plurality of display states are used in playback of captured images for confirming the depth range.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram illustrating an example of a functional configuration of a digital camera as an example of an image processing apparatus according to a first embodiment.

FIGS. 2A and 2B are diagrams schematically illustrating an example of a configuration of an imaging unit according to the first embodiment.

DESCRIPTION OF THE EMBODIMENTS

First Embodiment

Figure 3:
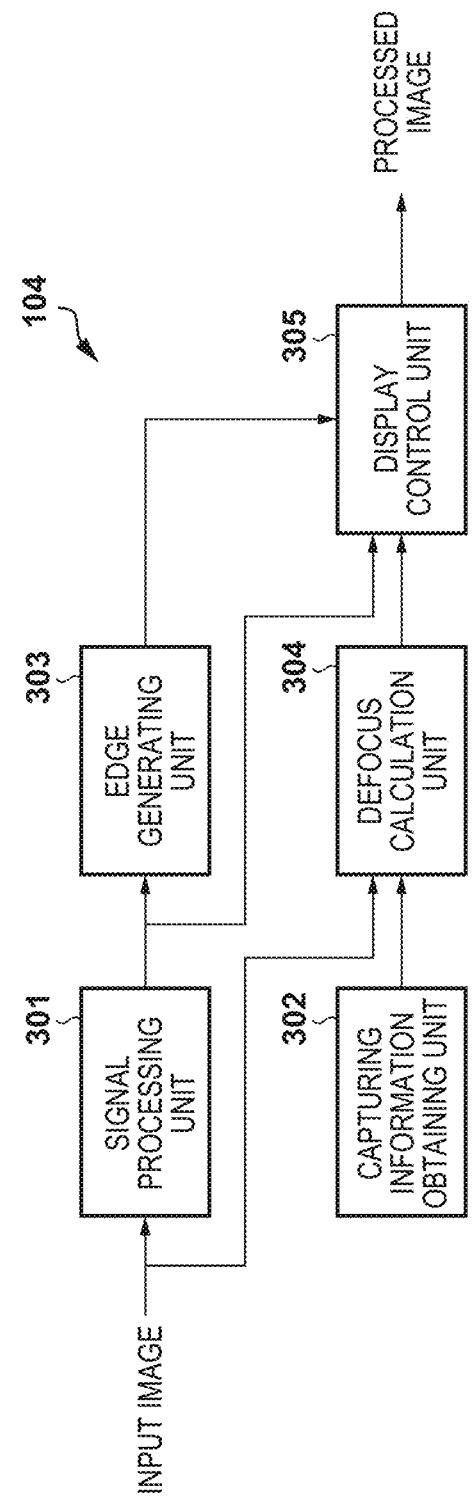
FIG. 3 is a block diagram illustrating an example of a functional configuration of an image processing unit according to the first embodiment.

Embodiments of the present invention are elaborated below with reference to the drawings. Note that the following describes a use-case where a user uses a photographing device such as a digital camera to correct an image or delete an image by determining the suitability of the image-capturing while confirming the depth range by viewing an EVF. However, the present embodiment is also applicable to an image processing device with which the operations described above can be performed by obtaining a captured image and viewing the obtained image. Further, the image processing device is also applicable to a case where the digital camera can be remotely controlled and where the user manipulates the device to correct the image and delete the image by determining the suitability of the image-capturing by obtaining the image captured by the digital camera and displaying the image on the image processing device, for example. Such an image processing device may include a digital camera, a mobile phone including a smartphone, a gaming device, a tablet terminal, a watch or spectacles information terminal, a medical device, and the like.

Configuration of Digital Camera

FIG. 1 is a block diagram illustrating an exemplary functional configuration of a digital camera 100 as an example of the image processing apparatus of the present embodiment. Note that one or more of the functional blocks illustrated in FIG. 1 may be implemented by hardware such as an ASIC and a programmable logic array (PLA); or by software executed by a programmable processor such as a CPU or an MPU. A combination of software and hardware may be used for the implementation. Accordingly, in the following description, even when different functional blocks are described as operating subjects, the same hardware may be implemented as a subject.

An optical system 101 includes a lens group including a zoom lens and/or a focusing lens, an aperture adjusting device for adjusting the light amount, and a shutter device. The optical system 101 adjusts the focus position and the magnification of a subject image reaching an imaging unit 102 by advancing and retracting the lens group in the optical axis direction.

The imaging unit 102 includes a photoelectric conversion element such as a CCD sensor and a CMOS sensor for converting a luminous flux of a subject having passed through the optical system 101 into an electrical signal through photoelectric conversion and outputs an analog image signal converted to the electrical signal at a predetermined time interval. The imaging unit 102 according to the present embodiment includes a pixel array as illustrated in FIG. 2A, and in this pixel array, individual pixels 202 are regularly two-dimensionally arranged. As illustrated in FIG. 2B, the pixel 202 in the pixel array includes a microlens 201 and a pair of photoelectric conversion units 203 and 204. The pair of photoelectric conversion units 203 and 204 receive respective luminous fluxes having passed through different regions of an exit pupil of the optical system 101 and perform photoelectric conversion. Thus, an image signal (e.g., referred to as image A) based on the photoelectric conversion unit 203 side and an image signal (e.g., referred to as image B) based on the photoelectric conversion unit 204 side have a phase difference in the subject image. The imaging unit 102 outputs analog image signals of the image A and the image B, for example.

An A/D conversion unit 103 converts the analog image signal output from the imaging unit 102 into a digital image signal. An image processing unit 104 performs a normal signal process and a defocus information superimposing process, described later, on the digital image signal from the imaging unit 102. Here, the normal signal process includes, for example, a noise reduction process, a developing process, and a process of compressing the tonality to a predetermined output range through a tonality compression process using gamma conversion. The image processing unit 104 can perform a similar image process not only on the image output from the AD conversion unit 103, but also on the image read from a recording unit 107. Note that a control unit 105 may include the image processing unit 104 so as to have the functions of the image processing unit 104.

The control unit 105 includes, for example, a processor such as a CPU and an MPU and controls the operations of the blocks included in the digital camera 100 by deploying the program recorded in a non-volatile memory 108 into a volatile memory 109 and executing the program. For example, the control unit 105 calculates an exposure amount in image-capturing for obtaining an input image with appropriate brightness and controls the aperture, the shutter speed, and the analog gain of the sensor by controlling the optical system 101 and the imaging unit 102 so as to achieve the calculated exposure amount. In addition, in the case where the control unit 105 serves also as the image processing unit 104, the control unit 105 executes the defocus information superimposing process described later.

A display unit 106 sequentially displays the image signal output from the image processing unit 104 on a display member such as an LCD. The recording unit 107 includes, for example, a storage medium such as a semiconductor memory and records an image taken by the imaging unit 102 and processed by the image processing unit 104 and the like. It is possible to include a removable information storage medium using a memory card in which a semiconductor memory is mounted, a package containing a rotational recording member such as a magneto-optical disk, and the like.

Configuration of Image Processing Unit

Next, a configuration of the image processing unit 104 according to the present embodiment is described with reference to FIG. 3. Each block of the image processing unit 104 may be achieved by a combination of software and hardware. Also, a plurality of functional blocks may be integrated, or one functional block may be separated.

A signal processing unit 301 performs, in addition to the above-described normal signal process such as a noise reduction process and a developing process, a tonality compression process through gamma conversion and the like to perform tonality compression to a predetermined output range. Note that the signal processing unit 301 may synthesize signals of the image A and the image B so as to handle one image signal. A capturing information obtaining unit 302 obtains various information such as the focal distance, the aperture value, the exposure time, and the capturing mode set by the user during image-capturing from the non-volatile memory 108 or the volatile memory 109 via the control unit 105, for example, and provides the information to a defocus calculation unit 304.

An edge generating unit 303 generates an edge signal from the image signal output from the signal processing unit 301. The defocus calculation unit 304 obtains the image signal of the image A and the image B. The defocus calculation unit 304 generates a defocus map indicating the distribution (i.e., the shift amount and shift direction of the focal point) of the defocus in the taken image on the basis of the phase difference of the subject image generated by luminous fluxes coming from different regions of the exit pupil of the optical system 101.

A display control unit 305 uses the output of the edge generating unit 303 and the defocus calculation unit 304 to generate (process) a processed image in which defocus information about the image is superimposed on the image and displays the processed image on the display unit 106.

Series of Operations Relating to Defocus Information Superimposing Process

Figure 4A:
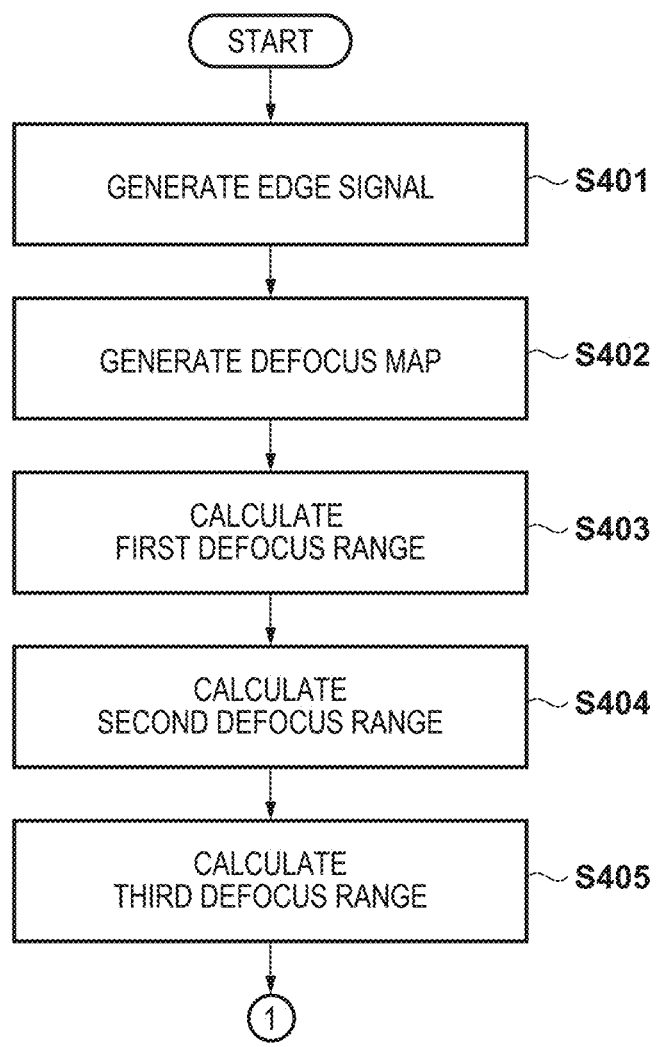
FIGS. 4A and 4B are flowcharts illustrating a plurality of series of operations according to a defocus information superimposing process according to the first embodiment.
Figure 4B:
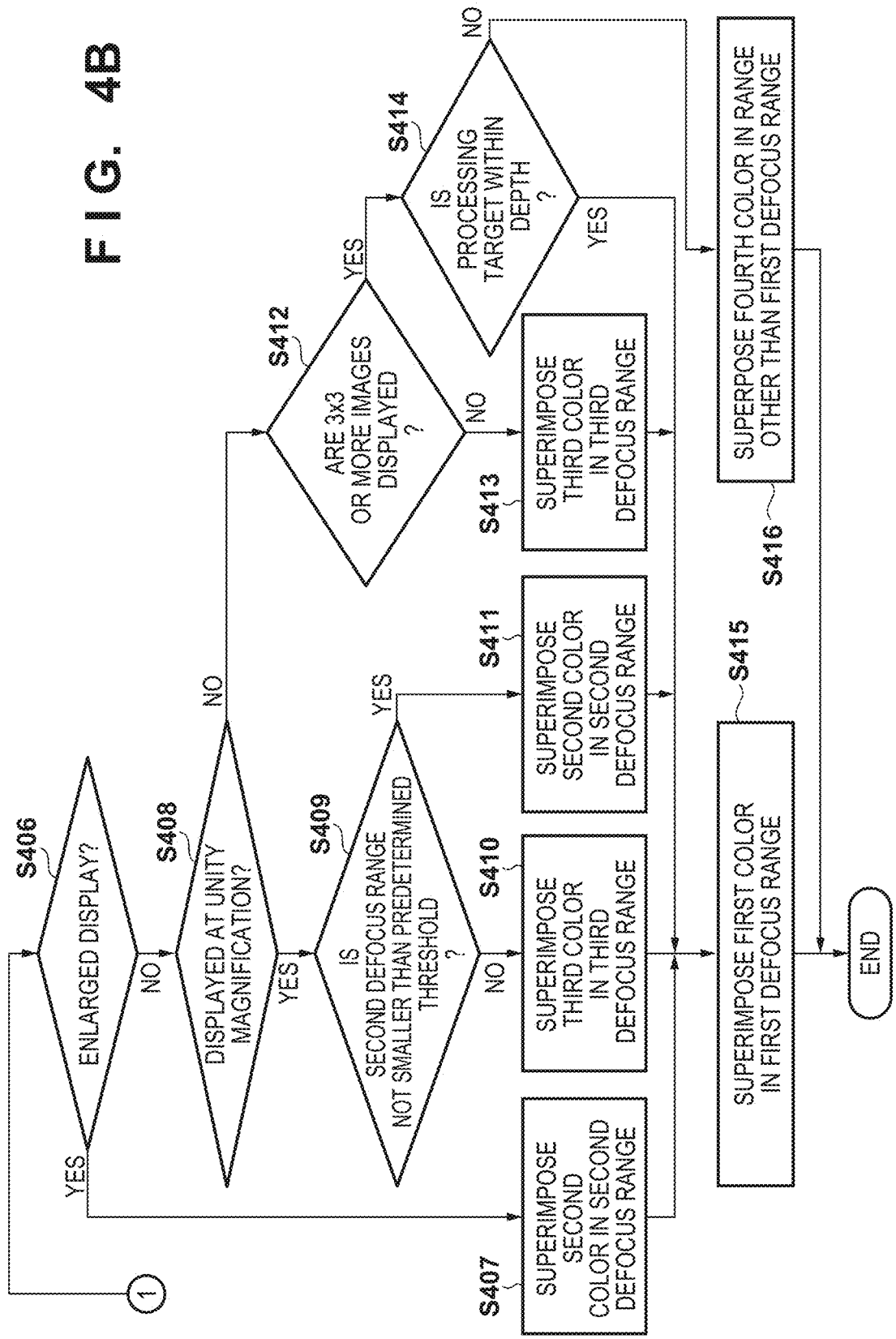
Figure 5A:
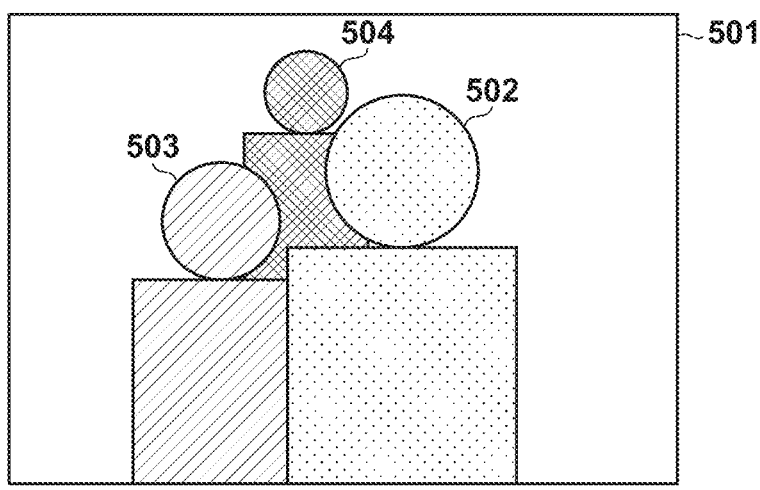
FIGS. 5A to 5C are diagrams illustrating an example of an input image, an edge image, and a defocus map according to the first embodiment.

Next, a plurality of series of operations of the defocus information superimposing process according to the present embodiment is described with reference to FIGS. 4A and 4B. The defocus information superimposing process is performed when the user displays an image on the EVF (i.e., the display unit 106) to confirm the depth range of the image taken by the user. While the following describes an example in which the process illustrated in FIGS. 4A and 4B are performed by the parts of the image processing unit 104 unless otherwise described, the process may be achieved by deploying the program of the non-volatile memory 108 into the volatile memory 109 and executing the program by the control unit 105 including the image processing unit 104. An input image 501 according to the present embodiment is an image that is displayed on the EVF during playback and is a scene in which three people (502, 503 and 504) are aligned from the front side to the depth side as viewed from the digital camera 100 as illustrated in FIG. 5A. Further, the following describes a case where the processes of S401 to S416 are performed for each image, but in the case where multi-display described below is performed, the processes may be repeated by the number of images required for the multi-display.

Figure 5B:
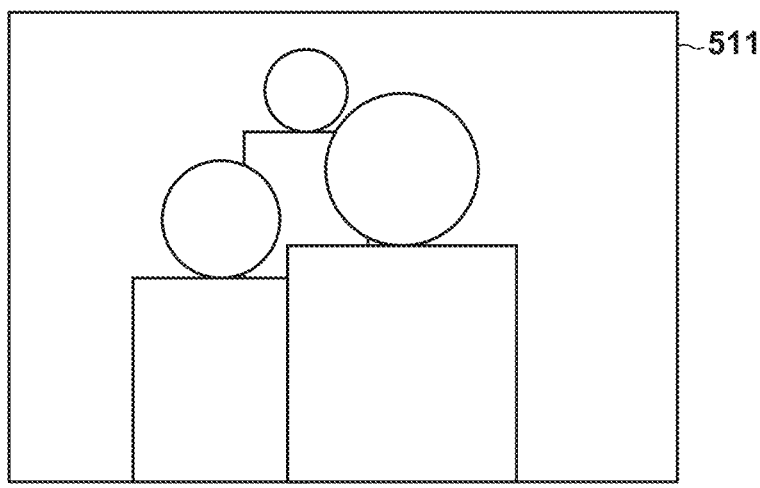

At S401, the edge generating unit 303 generates an edge image by applying a band-pass filter (Bpf) to the input image 501. Specifically, a signal to which a filter of [−1 0 2 0 −1] is applied in each of the horizontal direction and the vertical direction is added. Note that the method of generating an edge image is not limited to this, and it is also possible to adopt other methods such as a method of extracting edge components by calculating the difference between the original image and the image to which a low-pass filter (Lpf) is applied. An image 511 in FIG. 5B indicates an edge image obtained through the process of the edge generating unit 303.

Figure 5C:
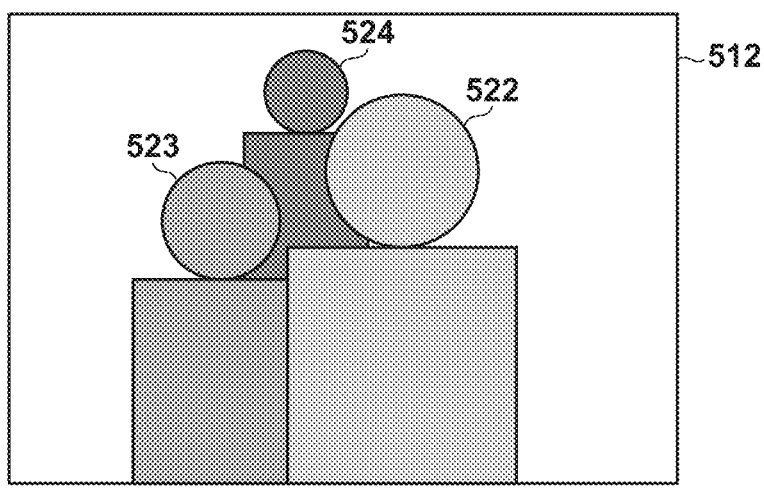

At S402, the defocus calculation unit 304 generates a defocus map for the input image 501. The defocus calculation unit 304 may use a known technique disclosed in Japanese Patent Laid-Open No. 2016-9062, for example, and calculates the defocus value (i.e., the shift amount and shift direction of the focal point) for each pixel so as to handle it as the defocus map. An image 512 in FIG. 5C illustrates an example of a defocus map obtained by the defocus calculation unit 304. In the image 512, the region of a person 523 at the center in the depth direction has a value indicating focus, a person 522 on the front side indicates non-focus of front blur, and a person 524 on the depth side indicates non-focus of back blur.

Figure 6:
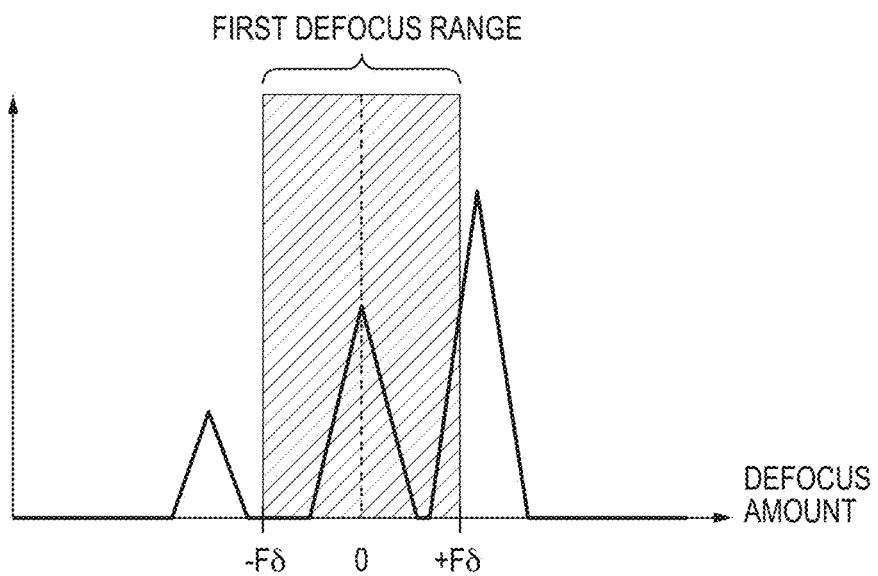
FIG. 6 is a diagram illustrating a depth range and a histogram of a defocus map according to the first embodiment.

At S403, the defocus calculation unit 304 calculates a first defocus range. Here, the first defocus range is a value range of defocus that is determined to be included in the depth of field at the time of still-image capturing, for example. This range is illustrated in FIG. 6, where the aperture value of the optical system 101 is represented by F, the value of the permissible circle of confusion (i.e., a value dependent on the number and size of pixels of the imaging unit 102) is represented by $\delta$, and the upper limit value and the lower limit value of the range are represented by $+F\delta$, and $-F\delta$, respectively. FIG. 6 illustrates a histogram of defocus for a defocus map 521. The defocus value indicated by the dashed line in FIG. 6 indicates that the value of defocus is 0. When the defocus value is 0, the degree of the focus is maximum, and the + values indicate changes of the degree of the focus in the direction of the front blur, and non-focus occurs when the value is equal to or greater than a predetermined value. On the other hand, the − values indicate changes of the degree of the focus in the direction of the back blur, and non-focus occurs when the value is equal to or greater than a predetermined value. That is, the region where the value of defocus falls within the range of $-F\delta$ to $+F\delta$ can be determined to be included within the depth of field (i.e., the first display defocus range).

Figure 7:
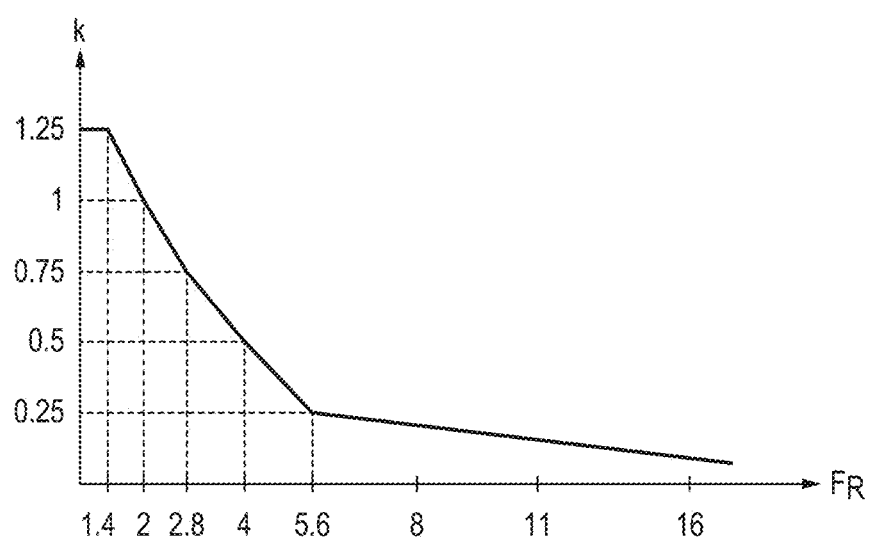
FIG. 7 is a diagram illustrating an example of a method of calculating a constant k that is determined in accordance with an aperture value according to the first embodiment.

At S404, a defocus range (second defocus range) in which the focus position is changeable with respect to the image 501 after image-capturing is calculated. Specifically, a variable determined according to the aperture value at the time of image-capturing is set as k, and a changeable range $kF\delta$ with respect to the focal position at the time of image-capturing is calculated. FIG. 7 illustrates a definition of a method of setting a value of a constant k. The horizontal axis represents $F_R$, which is an aperture value at the time when the input image 501 is captured, and a value range of k with respect to the value of $F_R$ is illustrated. In the example illustrated in FIG. 7, the smaller $F_R$, the greater the value of k. This is because the phase difference of a plurality of subject images generated by the imaging unit 102 becomes smaller as the aperture is reduced during image-capturing, making it difficult to change the focus position through readjustment of the phase difference. For example, when $F_R$ is 2, a focus readjustment of 1F$\delta$ can be performed.

While an example of the relationship between the aperture value and k is described in the present embodiment, the present invention is not limited thereto. For example, in the case where the digital camera 100 is a compound-eye camera including a plurality of the optical systems 101 and the imaging units 102, the focus position can be largely changed by obtaining a plurality of subject images with a greater phase difference, and therefore a value of k can be defined as a larger value.

At S405, the defocus calculation unit 304 calculates a third defocus range for the virtual aperture value of the case where the aperture value is changed from the value of the time of image-capturing. First, the defocus calculation unit 304 calculates two virtual aperture values as $F_{V+}$ and $F_{V-}$ in accordance with the following Equations (1) and (2).

$$F_{V+} = F_R \times (\sqrt{2})^{N_+} \quad (1)$$

$$F_{V-} = F_R \times (\sqrt{2})^{N_-} \quad (2)$$

Figure 8A:
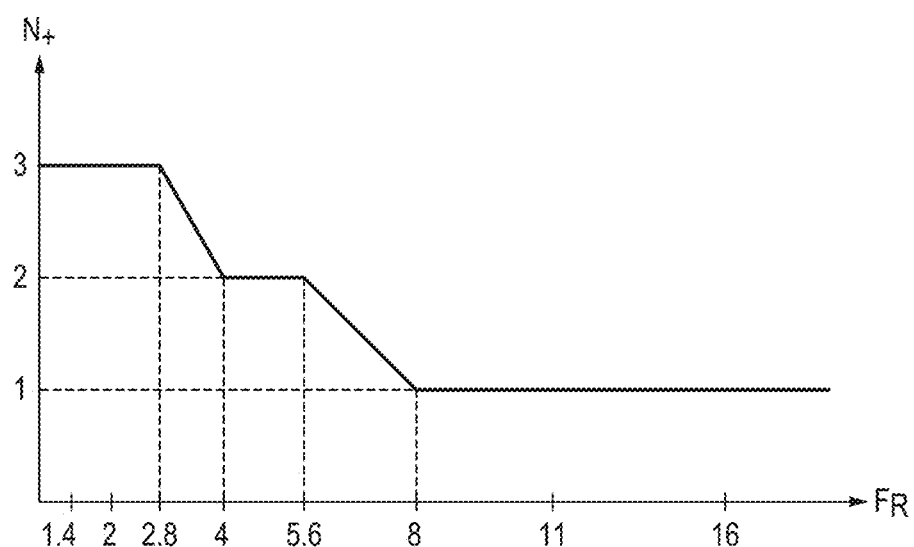
FIGS. 8A and 8B are diagrams illustrating an example of a method of calculating the number of stages $N_+$ and $N_-$ for changing an aperture value according to the first embodiment.
Figure 8B:
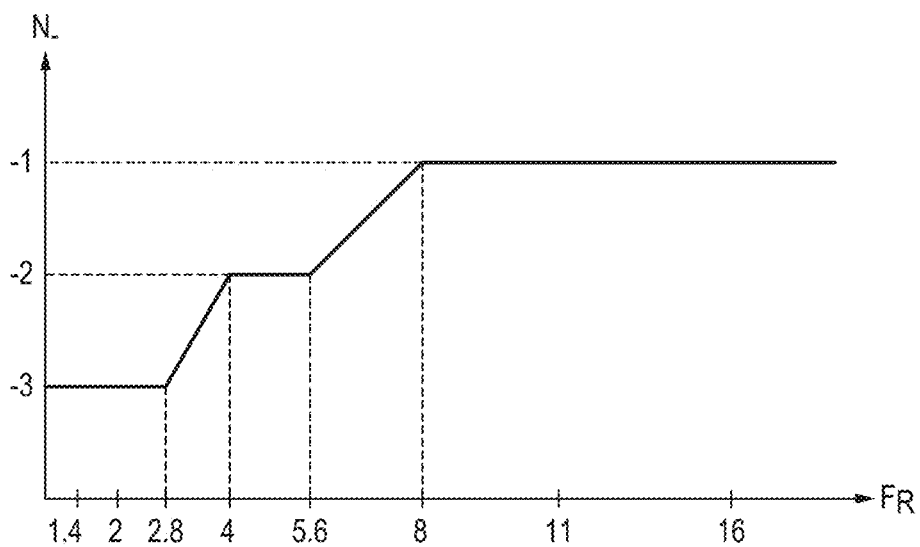

Here, $F_R$ represents an aperture value at the time of image-capturing, and $N_+$ and $N_-$ represent the number of steps of changing the aperture value for increasing or reducing the depth, which are both constants determined in accordance with $F_R$. FIGS. 8A and 8B illustrate a relationship between $F_R$ and $N_+$ and $N_-$. The horizontal axis represents $F_R$, which is the aperture value at the time of image-capturing of the input image 501, and the value range of $N_+$ or $N_-$ with respect to the value of $F_R$ is illustrated. In the example illustrated in FIGS. 8A and 8B, the greater the value of $F_R$, the smaller the value of $N_+$, whereas the greater the value of $F_R$, the greater the value of $N_-$. A purpose of this is to increase the amount of change of the focus range by virtually increasing the degree of changing the aperture value since the smaller the aperture value $F_R$ at the time of image-capturing, the smaller the amount of change of the depth (i.e., the focus range) at the time when the aperture value is changed. Note that the method of calculating the virtual aperture values $F_{V+}$ and $F_{V-}$ is not limited to the example described here, and it is also possible to adopt a different method such as a method in which $N_+$ is increased right upward with respect to $F_R$. In addition, it is also possible to adopt a method in which the user freely performs setting (e.g., through an operating member not illustrated) such that the depth is displayed with $F_{V+}$ as an aperture value changed by +1 level while displaying the depth of the time of opening with $F_{V-}$ being fixed to a minimum aperture value.

Figure 9:
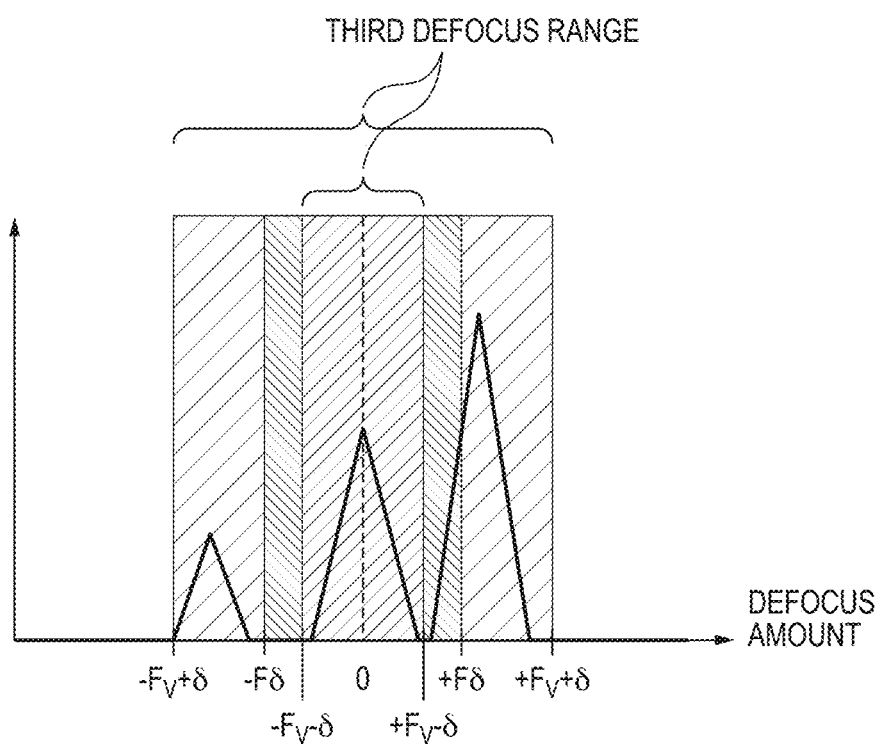
FIG. 9 is a diagram illustrating a histogram of a defocus map and a third display defocus range according to the first embodiment.

Then, the defocus calculation unit 304 calculates the third defocus range by using the calculated virtual aperture values $F_{V+}$ and $F_{V-}$. The calculation method is similar to that of S403, the upper limit value and the lower limit value of the case where the aperture value is changed to a large value are represented by $+F_{V+}\delta$ and $-F_{V+}\delta$, respectively, and the upper limit value and the lower limit value of the case where the aperture value is changed to a small value are represented by $+F_{V-}\delta$, and $-F_{V-}\delta$, respectively. FIG. 9 illustrates an example of the resulting third defocus range. In FIG. 9, two of the third defocus ranges constitute a narrower range and a wider range relative to the first defocus range calculated at S404. This indicates that the depth is reduced or increased as a result of virtual change of the aperture value.

At S406, the display control unit 305 determines whether the input image 501 is displayed on the EVF in an enlarged manner. When the display control unit 305 determines that the input image 501 is displayed in an enlarged manner, the process proceeds to S407; otherwise the process proceeds to S408.

At S407, the display control unit 305 applies a displaying process to the input image 501. Specifically, a blue (second color) signal is superimposed on the input image 501 in a region where the edge signal generated at S401 is equal to or greater than a predetermined value in the enlarged image and where the defocus value generated at S402 is included in the second defocus range calculated at S404. As a result, the user can determine whether the desired image can be obtained by changing the focus position after image-capturing without recapturing the image. While an example is described in which process of S407 is performed in the case where the image is displayed in an enlarged manner in the present embodiment, it is also applicable in the REC review after image-capturing even when the display is not an enlarged display. Also in this manner, useful information for determining whether recapturing is required can be provided to the user.

At S408, the display control unit 305 determines whether the input image 501 is displayed at unity magnification on the EVF. When the display control unit 305 determines that the input image 501 is displayed at unity magnification, the process proceeds to S409; otherwise, the process proceeds to S412. At S409, the display control unit 305 determines whether the second defocus range calculated at S404 is not smaller than a predetermined threshold (e.g., not smaller than 1F$\delta$). When the display control 305 determines that the second defocus range is not smaller than 1F$\delta$, the process proceeds to S411; otherwise the process proceeds to S410.

At S410, the display control unit 305 applies a displaying process to the input image 501. For example, the display control unit 305 superimposes a red (third color) signal on the input image 501 in a region where the edge signal generated at S401 is equal to or greater than a predetermined value and where the defocus value generated at S402 is included in the third defocus range calculated at S405.

At S411, the display control unit 305 applies a displaying process to the input image 501. Specifically, the display control unit 305 superimposes the blue (second color) signal on the input image 501 in the region where the edge signal generated at S401 is equal to or greater than a predetermined value and where the defocus value generated at S402 is included in the second defocus range calculated at S404.

Now, the reason for selecting the region to which the process is applied as either of the regions included in the second defocus range and the third defocus range in the above-described processes of S409 to S411 is described. The second defocus range is a range where the focus position is changeable and depends on the aperture value and the phase difference of the plurality of subject images as described in S404. When the range where the focus positions is changeable is, for example, 0.1 F$\delta$ (k=0.1 in FIG. 7), the region included in this range is a very small region in the image. That is, it is considered that, when the user confirms this region, the image cannot be visually confirmed without enlarging the image. In such a case, application of the process to the region included in the range where the focus position is changeable can hardly provide beneficial information to the user. On the other hand, information beneficial to the user can be provided by indicating the depth range of the case where the aperture value is changed since this allows the user to determine to recapture the image by changing the capturing condition and the like.

At S412, the display control unit 305 determines whether to display a plurality of images of a predetermined number or greater on the EVF. Specifically, in multi-playback in which a plurality of images are simultaneously displayed, whether 3×3 (nine) or more images are displayed on the EVF is determined. When the display control unit 305 determines that 3×3 or more images are displayed, the process proceeds to S414; otherwise, the process proceeds to S413. At S413, the display control unit 305 applies a displaying process to the input image 501. Specifically, as in S410, a red (third color) signal is superimposed on the input image 501 in a region included in the third defocus range.

At S414, the display control unit 305 determines whether the target for the displaying process is within the depth. For example, the user can set the processing target through an operating member not illustrated, and the display control unit 305 makes a determination by reading the set value from the non-volatile memory 108, for example. Note that when 3×3 or more images are being simultaneously displayed, the display magnification of each image is small (each image is scaled to a small size), and as such the visibility may be reduced when the entire region within the depth is processed to superimpose the color signal. For this reason, it is preferable to superimpose a predetermined color signal only in the region outside the depth of each image.

At S415, the display control unit 305 applies a displaying process to the input image 501. Specifically, the display control unit 305 superimposes a green signal on the input image 501 in a region where the edge signal generated at S401 is equal to or greater than a predetermined value and where the defocus value generated at S402 is included in the first defocus range. Note that in the case where a signal of a predetermined color is superimposed on the second or third defocus range at S407, S410, S411, and S413, a green (first color) signal is further superimposed on the region included in the first defocus range at the present step. On the other hand, in the case where the processing target is within the depth in multi-playback of 3×3 (in total, 9) or more images, a color signal is superimposed only on the first defocus range.

At S416, the display control unit 305 applies a displaying process to the input image 501. Specifically, a yellow (fourth color) signal is superimposed on the input image 501 in a region where the edge signal generated at S401 is equal to or greater than a predetermined value and where the defocus value generated at S402 is not included in the first defocus range calculated at S403. After outputting the image subjected to superimposition by the display control unit 305, the image processing unit 104 terminates the superimposing process of the defocus information. In the case where the multi-display is performed, the image processing unit 104 terminates the series of operations when processes corresponding to the number of images required for the display are completed.

Figure 10A:
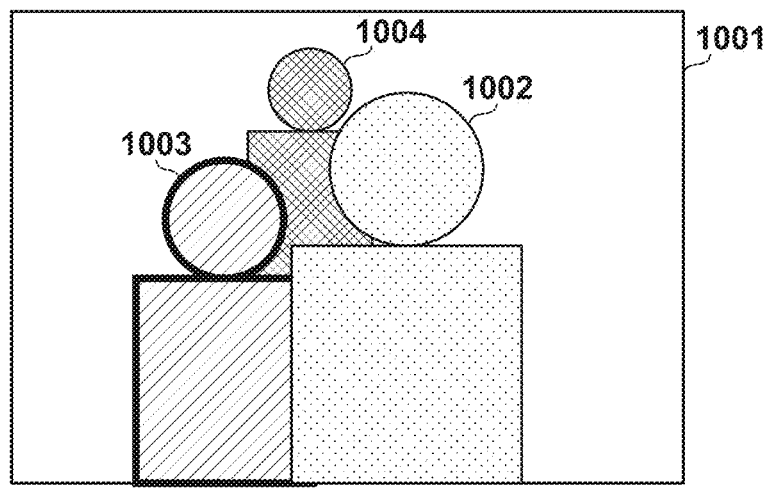
FIGS. 10A to 10C are diagrams illustrating an example of a processed image for a region included in first to third defocus ranges according to the first embodiment.

A specific example of an image generated by the superimposing process of the defocus information described above is described below. FIG. 10A illustrates an image that is generated through the process of S415 on the input image 501 (i.e., the process on the region included in the first defocus range). In the example illustrated in FIG. 10A, a green signal is superimposed on the edge region of a person 1003 at the center in the depth direction in an image 1001 and is conspicuous (bold line). On the other hand, it can be confirmed that two people 1002 and 1004 other than the person 1003 are outside the depth since the green is not superimposed thereon.

Figure 10B:
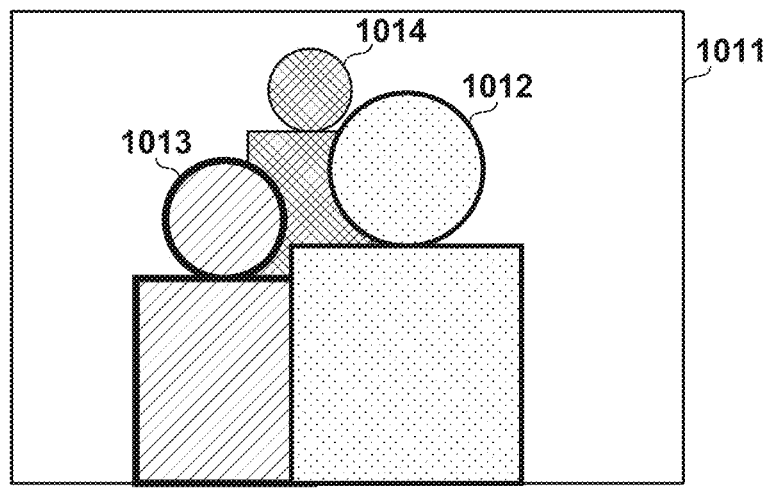

Further, FIG. 10B illustrates an image on which the process of S407 (as with S411) (i.e., the process on the region included in the second defocus range), in addition to the process of S415, is performed. In FIG. 10B, a color signal is superimposed on the edge region of a person 1012 (thick lines) in addition to the edge region of a person 1013 at the center in the depth direction in the image 1011. Thus, the user can determine that the person 1012, who has been outside the depth at the time of image-capturing, is in a range where focusing can be performed through focus adjustment after image-capturing.

Figure 10C:
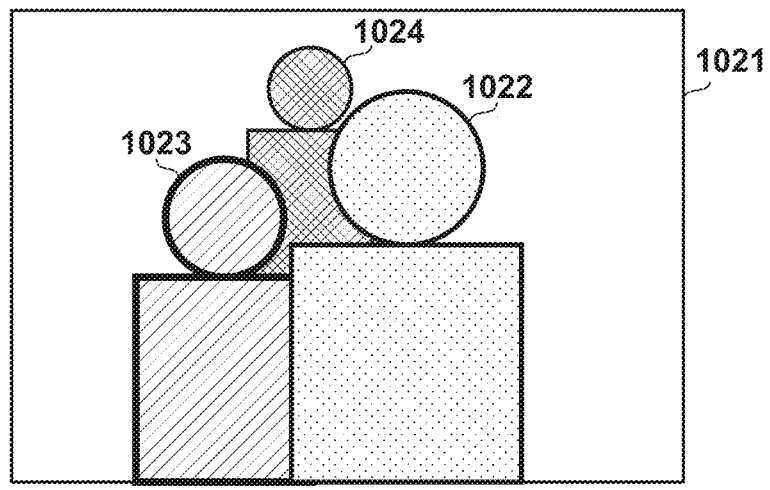

FIG. 10C illustrates an image on which the process of S410 (as with S414) (i.e., the process on the region included in the third defocus range), in addition to process of S415, is performed. An image 1021 in FIG. 10C is an image on which the process is performed in a region included in $-F_{V+}\delta$ to $+F_{V+}\delta$, which is the third defocus range, in the case where the aperture value is changed (further reduced) to a large value. In the image 1021, the color signal is superimposed on the edge regions of person 1022 and 1024 (thick lines) in addition to the edge region of a person 1023 at the center in the depth direction. Thus, the user can determine that the person 1022 and 1024, who have been outside the depth at the time of image-capturing, can be included in the depth range by capturing the image by changing (in this case, further reducing) the aperture.

While the process is performed in the depth range of the case where the aperture value is increased as the third defocus range in the above-mentioned description, a signal of a different color may be additionally superimposed on the depth range of the case where the aperture value is reduced. For example, by superimposing different color signals such as red for the depth region of the case where the aperture value is increased and orange for the depth region in the case where the aperture value is reduced, it is possible to indicate the degree of change in the depth of the case where the aperture value is changed.

Figure 11:
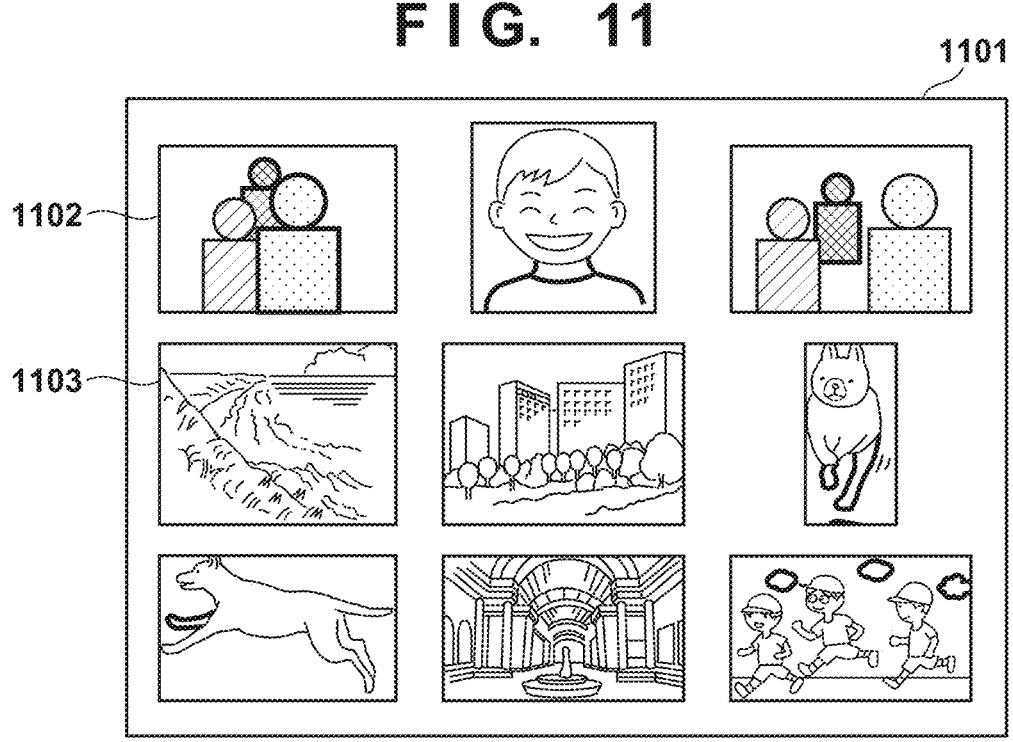
FIG. 11 is a diagram illustrating an example of a processed image for a region outside the first defocus range in a multi-display according to the first embodiment.

FIG. 11 illustrates an image on which the process of S416 (i.e., the process on the region that is not included in the first defocus range that is the depth range at the time of image-capturing) is performed. An image 1101 illustrated in FIG. 11 indicates nine captured images that are displayed on the EVF, and each image is downsized in comparison with the case where only one image is displayed. In the example illustrated in FIG. 11, the process is not performed on the region included in the depth, while a color signal is superimposed (thick lines) only on the edge portion of the region outside the depth in each image. For example, the people other than the person at the center are not included in the depth range, and therefore the process is performed on them. In addition, in an image 1103, the entire image is included in the depth range, and therefore the process is not performed in any region. In this manner, the user can easily perform a desired operation with good visibility in an operation of selecting an image that is focused on a main subject and an operation of selecting and deleting a failed photograph whose entire image is out-of-focus.

As described above, according to the present embodiment, information indicating the defocus range is displayed on the basis of the display mode and the defocus information (i.e., indicating the shift amount and shift direction of the focal point in the image). At this time, the displays using the information indicating the first (or fourth) defocus range and the information indicating the second defocus range or the third defocus range are changed in accordance with the number of images to be displayed. To be more specific, in the case where a plurality of images equal to or greater in number than a predetermined number are displayed on the display unit, information indicating the first (or fourth) defocus range is superimposed. In the case where images fewer in number than a predetermined number are displayed, at least information indicating the second defocus range or the third defocus range is superimposed. In this manner, the user can easily confirm the information of the defocus range as desired, and confirmation of focus, depth change (i.e. correction) after the image-capturing, selection and deletion of an image, and the like are eased. In other words, in playback of the captured image to confirm the depth range, the desired confirmation can be easily performed even when a plurality of display states are used.

Note that in the present embodiment, an example has been described in which the range within the depth with respect to one aperture value is processed so as to be expressed in one color. Alternatively, the expression of the range within the depth is not limited thereto, and it is also possible to perform the process using different colors with a value indicating focus as a threshold (with the defocus value as 0). For example, the defocus values may be gradually expressed by coloring a front region (front side) and a back region (back side) relative to the focus position with light blue and dark blue, respectively, for example. In this manner, the user can recognize the front and back relationship of the subject and can easily determine the side to which the focus position should be adjusted. In particular, in the case where the two subjects are two-dimensionally separated from each other in the image and where the front and back relationship of the subjects are difficult to be determined only by visual recognition, although they have defocus values close to each other, the front and back relationship of the subjects can be easily recognized. In addition, rather than superimposing a color signal on images, the display control unit 305 may use other methods such as a method in which a signal in which the luminance and/or the saturation is changed in accordance with the defocus value is superimposed on the image.

In addition, in the present embodiment, a configuration has been described in which a subject image generated by a luminous flux having passed through different regions of the pupil of the image-capturing optical system is obtained and in which a defocus map is generated on the basis of the phase difference as illustrated in FIG. 2A. However, other configurations and units may be used or combined. For example, it is also possible to adopt a configuration in which, with a compound camera including a plurality of lenses and imaging elements, a more accurate image shift amount can be detected on the basis of a plurality of images having a plurality of different viewpoints or a plurality of different focus positions. In addition, with a configuration in which the distance can be measured with a time of flight (TOF) camera and ultrasonic waves, defocus information can be obtained, and the distance measurement performance for a subject with poor pattern change can be improved.

Second Embodiment

A second embodiment is described below. In the present embodiment, an example is described in which the display order of the image is changed in addition to applying the process during multi-playback at S416. Note that the configuration of a digital camera 1000 according to the present embodiment is substantially the same as that of the first embodiment. In the first embodiment, a series of operations is performed for each image in the defocus information superimposing process. The present embodiment differs from the first embodiment in that a plurality of images are processed at a time and the display order of the images is changed. Therefore, descriptions of common configurations and operations will be omitted, and the differences will be described in detail.

Series of Operations Relating to Defocus Information Superimposing Process

The defocus information superimposing process according to the present embodiment is described below with reference to FIGS. 4A and 4B. At S403, the defocus calculation unit 304 calculates the first defocus range (i.e., the depth range) for all the images recorded in the recording unit 107.

At S416, first, the display control unit 305 superimposes a yellow (fourth color) signal on the input image 501 in the region not included in the first defocus range. Thereafter, the defocus calculation unit 304 counts the pixels included in the depth (first defocus range) in each image and changes the display order of the images in accordance with the number of counts of the pixels.

Figure 12:
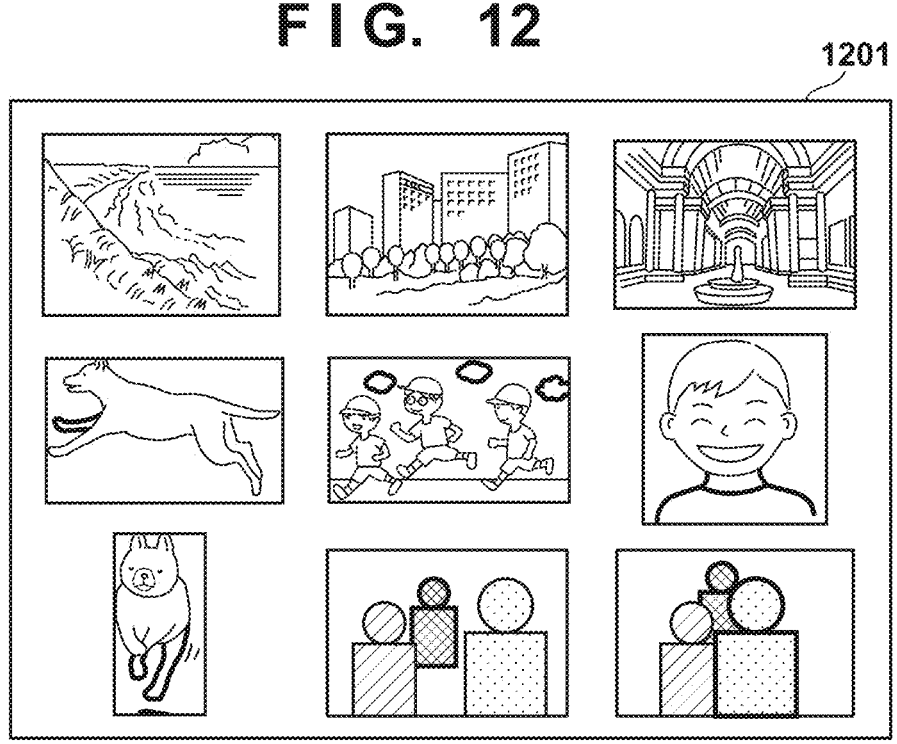
FIG. 12 is a diagram illustrating a modified example of a display order of a multi-display according to a second embodiment.

Specifically, the display control unit 305 displays the images such that images with more pixels included in the depth (the first defocus range) are displayed closer to the head of the plurality of images. A result is illustrated as an image 1201 in FIG. 12, in which the images are ordered such that the image with fewer pixels in the depth (first defocus range) is closer to the last (lower right) of the plurality of images. Thus, the user can easily find a failed image when there is a failed image that is entirely out-of-focus. After displaying the plurality of images, or after the operation of the image by the user has been completed, the image processing unit 104 terminates the series of processes.

As described above, in the present embodiment, images with more pixels included in the depth (the first defocus range) are displayed closer to the head of the plurality of images. Thus, an image with a desirable focus (or an out-of-focus image) can be easily found. That is, the user can more easily perform selection, deletion or the like of the image.

However, the present embodiment is not limited to this embodiment and may be modified such that images with less pixels included in the depth are displayed closer to the head of the plurality of images or that images in which the pixels are less than 10% in the depth are always displayed last.

In addition, while the process of changing the display order of the plurality of images in accordance with the number of pixels included in the defocus range has been described in the present embodiment, it is also possible to perform jump-playback in accordance with the number of pixels in the defocus range. For example, in the case where one image is displayed at unity magnification, the image is switched to the head of images whose proportion of pixels in the depth is 90% or greater, then to the head of images whose proportion of 70% or greater, then to that of 40% or greater, and to that of 10% or greater, in response to reception of an instruction of sending an image from the user. Thus, the user can collectively confirm the images with a desirable focus and/or the images that are almost out-of-focus while displaying the images without downsizing the images (i.e., while ensuring the visibility of details).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-215783, filed on Nov. 16, 2018, which is hereby incorporated by reference herein in its entirety.

What is claimed is:

1. An image processing apparatus comprising
a memory and at least one processor which function as:
an obtaining unit configured to obtain one or more images; and
a display control unit configured to display the one or more images on a display in a different display mode and to superimpose, on an image displayed on the display, information indicating a defocus range of the image on a basis of the display mode and defocus information indicating a shift amount and a shift direction of a focal point in the image displayed on the display,
wherein, in a case where a first number of images are displayed simultaneously on the display as a first display mode, the display control unit displays information indicating a defocus range of focus or non-focus on a basis of the defocus information, and, in a case where a second number of images are displayed simultaneously on the display as a second display mode, the display control unit displays information indicating a defocus range in which a focus position is changeable or a defocus range of a case where an image is captured on a different aperture value from an aperture value of a time of image-capturing of displayed image.

2. The image processing apparatus according to claim 1, wherein
the display control unit superimposes the information indicating the defocus range of focus or non-focus, in a case where a plurality of images of a predetermined number or greater are displayed simultaneously on the display; and
the display control unit superimposes at least the information indicating the defocus range in which the focus position is changeable or the defocus range of the case where the image is captured on the different aperture value from the aperture value of the time of image-capturing of the displayed image, in a case where an image or images fewer in number than the predetermined number are displayed on the display.

3. The image processing apparatus according to claim 2, wherein the display control unit superimposes the information indicating the defocus range of focus or non-focus and the information indicating the defocus range in which the focus position is changeable or the defocus range of the case where the image is captured on the different aperture value from the aperture value of the time of image-capturing of the displayed image, in a case where one image is displayed on the display.

4. The image processing apparatus according to claim 2, wherein the display control unit superimposes the information indicating the defocus range of focus or non-focus and the information indicating the defocus range in which the focus position is changeable, when one image is displayed on the display and in a case where a defocus range in which a focus position is changeable in the one image is equal to or greater than a threshold.

5. The image processing apparatus according to claim 2, wherein the display control unit superimposes the information indicating the defocus range of focus or non-focus and the information indicating the defocus range in which the focus position is changeable, in a case where one image which is at least partially enlarged is displayed on the display.

6. The image processing apparatus according to claim 2, wherein the display control unit superimposes the information indicating the defocus range of focus or non-focus and the information indicating the defocus range of the case where the image is captured on the different aperture value from the aperture value of the time of image-capturing of the displayed image, in a case where a plurality of images fewer in number than the predetermined number are displayed on the display.

7. The image processing apparatus according to claim 1, wherein the defocus range of focus or non-focus is a range determined based on the aperture value of a time when the image is taken.

8. The image processing apparatus according to claim 1, wherein the defocus range in which the focus position is changeable is a range which enables refocus in which the focus position is changeable in the image after image-capturing.

9. The image processing apparatus according to claim 1, wherein the defocus range of the case where the image is captured on the different aperture value from the aperture value of the time of image-capturing of the displayed image is a range determined based on a second aperture value that is a virtual value different from a first aperture value of a time of image-capturing of the displayed image.

10. The image processing apparatus according to claim 1, wherein the information indicating the defocus range of focus or non-focus and the information indicating the defocus range in which the focus position is changeable or the defocus range of the case where the image is captured on the different aperture value from the aperture value of the time of image-capturing of the displayed image are each displayed in accordance with the shift amount and the shift direction of the focal point in the image.

11. The image processing apparatus according to claim 1, wherein the display control unit changes a display order of a plurality of images on a basis of a number of pixels included in the defocus range of focus in each image, when the plurality of images of a predetermined number or greater are displayed simultaneously on the display.

12. The image processing apparatus according to claim 1, wherein the defocus information is obtained based on a phase difference of a subject image generated by luminous fluxes that have passed through different regions of a pupil of an imaging optical system.

13. The image processing apparatus according to claim 12, wherein the defocus information is obtained based on a plurality of images having a plurality of different viewpoints or a plurality of different focus positions.

14. The image processing apparatus according to claim 1, wherein the defocus information is obtained based on a signal of sound waves or light.

15. The image processing apparatus according to claim 1, wherein the display control unit uses an edge signal in the image to display the information indicating the defocus range of focus or non-focus and the information indicating the defocus range in which the focus position is changeable or the defocus range of the case where the image is captured on the different aperture value from the aperture value of the time of image-capturing of the displayed image.

16. The image processing apparatus according to claim 9, the at least one processor further function as a setting unit configured to receive input by a user for setting the second aperture value.

17. A control method of an image processing apparatus, the method comprising
obtaining one or more images; and
display controlling by displaying the one or more images on a display in a different display mode and superimposing, on an image displayed on the display, information indicating a defocus range of the image on a basis of the display mode and defocus information indicating a shift amount and a shift direction of a focal point in the image displayed on the display,
wherein, in case where a first number of images are displayed simultaneously on the display as a first display mode, the display controlling includes displaying information indicating a defocus range of focus or non-focus on a basis of the defocus information, and, in a case where a second number of images are displayed simultaneously on the display as a second display mode, the display control unit displays information indicating a defocus range in which a focus position is changeable or a defocus range of a case where an image is captured on a different aperture value from an aperture value of a time of image-capturing of displayed image.

18. A non-transitory computer-readable storage medium storing a program for causing a computer to execute a control method of an image processing apparatus, the method comprising
obtaining one or more images; and
display controlling by displaying the one or more images on a display in a different display mode and superimposing, on an image displayed on the display, information indicating a defocus range of the image on a basis of the display mode and defocus information indicating a shift amount and a shift direction of a focal point in the image displayed on the display,
wherein, in case where a first number of images are displayed simultaneously on the display as a first display mode, the display controlling includes displaying information indicating a defocus range of focus or non-focus on a basis of the defocus information, and, in a case where a second number of images are displayed simultaneously on the display as a second display mode, the display control unit displays information indicating a defocus range in which a focus position is changeable or a defocus range of a case where an image is captured on a different aperture value an aperture value of a time of image-capturing of displayed image.

* * * * *